US010298666B2

United States Patent
Ringdahl et al.

(10) Patent No.: US 10,298,666 B2
(45) Date of Patent: May 21, 2019

(54) RESOURCE MANAGEMENT FOR MULTIPLE DESKTOP CONFIGURATIONS FOR SUPPORTING VIRTUAL DESKTOPS OF DIFFERENT USER CLASSES

(71) Applicant: VMware, Inc., Palo Alto, CA (US)

(72) Inventors: Kenneth Ringdahl, Pelham, NH (US); Eugenia Kondratova, Ottawa (CA); Jonathan Fontaine, Hudson, NH (US); Debabrata Sengupta, Westford, MA (US); Christopher De Angelis, Southborough, MA (US); Nevon Brake, Kanata (CA)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 15/724,487

(22) Filed: Oct. 4, 2017

(65) Prior Publication Data
US 2018/0027053 A1    Jan. 25, 2018

Related U.S. Application Data

(63) Continuation of application No. 14/203,520, filed on Mar. 10, 2014, now Pat. No. 9,800,650.

(51) Int. Cl.
*H04L 29/08*    (2006.01)
*G06F 9/455*    (2018.01)
(Continued)

(52) U.S. Cl.
CPC .............. *H04L 67/10* (2013.01); *G06F 9/455* (2013.01); *G06F 9/46* (2013.01); *G06F 9/5077* (2013.01)

(58) Field of Classification Search
CPC ...................................................... H04L 67/10
See application file for complete search history.

(56) References Cited

U.S. PATENT DOCUMENTS 5,063,500 A * 11/1991 Shorter ................ G06F 9/5033
709/226
5,564,016 A * 10/1996 Korenshtein ....... G06F 21/6218
726/3

(Continued)

OTHER PUBLICATIONS

First office action in U.S. Appl. No. 11/875,297, dated Oct. 5, 2009.
(Continued)

*Primary Examiner* — Jimmy H Tran
(74) *Attorney, Agent, or Firm* — Fish & Richardson P.C.

(57) ABSTRACT

A service provider can efficiently allocate server computer resources to tenant users, while isolating tenants from such allocation decisions. A tenant specifies a desktop model to be used for virtual desktops to be provisioned for a pool of users. The service provider has desktop managers for each tenant, each of which manages a homogeneous set of server computers to be used for provisioning virtual desktops for the tenant. Different desktop managers for a tenant are used to manage different sets of server computers to support virtual desktops using different desktop models or desktop models with different resource requirements. A resource manager of the service provider assigns virtual desktops to a desktop manager in a manner that optimizes the utilization of the server computers by using information about the desktop model used by the virtual desktops.

18 Claims, 6 Drawing Sheets

(51) Int. Cl.
*G06F 9/50* (2006.01)
*G06F 9/46* (2006.01)

(56) References Cited

U.S. PATENT DOCUMENTS

| | | | | |
|---|---|---|---|---|
| 5,774,878 | A * | 6/1998 | Marshall | G06F 3/04815 705/36 R |
| 6,055,563 | A * | 4/2000 | Endo | G06T 1/00 709/203 |
| 6,067,545 | A * | 5/2000 | Wolff | H04L 67/1008 |
| 6,070,142 | A * | 5/2000 | McDonough | G06Q 10/06 379/225 |
| 6,341,303 | B1 * | 1/2002 | Rhee | G06F 9/4881 710/240 |
| 6,615,253 | B1 * | 9/2003 | Bowman-Amuah | G06F 17/30902 707/999.1 |
| 6,799,209 | B1 * | 9/2004 | Hayton | H04L 43/00 709/203 |
| 7,299,033 | B2 | 11/2007 | Kjellberg et al. | |
| 7,340,522 | B1 * | 3/2008 | Basu | G06F 9/5033 709/217 |
| 7,373,451 | B2 * | 5/2008 | Lam | G06F 9/44505 709/220 |
| 7,398,349 | B2 * | 7/2008 | Birrell | G06F 3/061 711/103 |
| 7,526,300 | B2 * | 4/2009 | Choi | H04L 51/38 455/414.1 |
| 7,587,352 | B2 * | 9/2009 | Arnott | G06Q 10/063 705/35 |
| 7,802,248 | B2 * | 9/2010 | Broquere | G06F 9/5077 709/201 |
| 7,917,450 | B1 * | 3/2011 | Musuvathy | G06Q 10/06 705/400 |
| 7,941,801 | B2 | 5/2011 | Williams et al. | |
| 8,065,676 | B1 * | 11/2011 | Sahai | G06F 9/5077 709/226 |
| 8,166,475 | B1 * | 4/2012 | Scales | G06F 9/45558 709/223 |
| 8,364,802 | B1 * | 1/2013 | Keagy | G06F 8/63 709/223 |
| 8,380,853 | B2 | 2/2013 | Kudo | |
| 8,387,132 | B2 * | 2/2013 | Frank | H04L 29/12009 726/15 |
| 8,423,998 | B2 | 4/2013 | Isci | |
| 8,549,513 | B2 * | 10/2013 | Vinberg | G06F 8/61 717/174 |
| 8,560,671 | B1 * | 10/2013 | Yahalom | H04L 67/1097 709/224 |
| 8,938,775 | B1 * | 1/2015 | Roth | G06F 21/606 726/1 |
| 9,251,115 | B2 * | 2/2016 | Bursell | G06F 15/177 |
| 9,588,657 | B1 * | 3/2017 | Grechishkin | G06F 9/45558 |
| 9,846,590 | B2 * | 12/2017 | Chen | G06F 9/45558 |
| 2001/0056494 | A1 * | 12/2001 | Trabelsi | G06F 9/468 709/229 |
| 2002/0069102 | A1 * | 6/2002 | Vellante | G06Q 10/06312 705/7.22 |
| 2002/0091697 | A1 * | 7/2002 | Huang | G06F 17/30867 |
| 2002/0129126 | A1 * | 9/2002 | Chu | G06F 8/20 709/220 |
| 2002/0152094 | A1 * | 10/2002 | Fahraeus | G06F 3/03545 705/500 |
| 2003/0006988 | A1 * | 1/2003 | Alford, Jr. | G06T 17/00 345/440 |
| 2003/0055666 | A1 * | 3/2003 | Roddy | B61L 27/0094 705/305 |
| 2003/0149567 | A1 * | 8/2003 | Schmitz | G06F 17/3089 704/270 |
| 2004/0003087 | A1 * | 1/2004 | Chambliss | G06F 11/1076 709/226 |
| 2004/0024627 | A1 * | 2/2004 | Keener | G06Q 10/06 705/7.36 |
| 2004/0054786 | A1 * | 3/2004 | Kjellberg | G06F 17/30905 709/228 |
| 2004/0054787 | A1 * | 3/2004 | Kjellberg | G06F 17/30905 709/228 |
| 2004/0093247 | A1 * | 5/2004 | Baken | G06Q 10/06 705/7.36 |
| 2005/0108709 | A1 * | 5/2005 | Sciandra | G06F 9/505 718/1 |
| 2005/0196303 | A1 * | 9/2005 | Kenney | B01L 3/021 417/413.1 |
| 2005/0198130 | A1 * | 9/2005 | Bosloy | H04L 12/185 709/204 |
| 2005/0198303 | A1 | 9/2005 | Knauerhase et al. | |
| 2005/0273568 | A1 * | 12/2005 | Blandy | G06F 12/023 711/170 |
| 2005/0273862 | A1 * | 12/2005 | Benaloh | G06F 21/10 726/26 |
| 2006/0070077 | A1 * | 3/2006 | Erlandson | G06F 11/0748 718/104 |
| 2006/0143417 | A1 * | 6/2006 | Poisner | G06F 21/6227 711/164 |
| 2006/0143617 | A1 * | 6/2006 | Knauerhase | G06F 9/50 718/104 |
| 2006/0230156 | A1 * | 10/2006 | Shappir | G06F 3/1454 709/227 |
| 2006/0253848 | A1 * | 11/2006 | Mathieu | G06F 8/61 717/168 |
| 2006/0276174 | A1 * | 12/2006 | Katz | G06F 17/30864 455/410 |
| 2006/0294238 | A1 * | 12/2006 | Naik | G06F 9/5072 709/226 |
| 2007/0016432 | A1 * | 1/2007 | Piggott | G06Q 10/06 705/7.37 |
| 2007/0043861 | A1 * | 2/2007 | Baron | H04L 41/0631 709/224 |
| 2007/0083630 | A1 * | 4/2007 | Roth | G06F 11/3688 709/223 |
| 2007/0106798 | A1 * | 5/2007 | Masumitsu | G06F 9/5027 709/226 |
| 2007/0157309 | A1 * | 7/2007 | Bin | H04L 63/0272 726/15 |
| 2007/0180448 | A1 * | 8/2007 | Low | G06F 3/1415 718/1 |
| 2007/0214455 | A1 * | 9/2007 | Williams | G06F 9/5044 718/1 |
| 2007/0250833 | A1 * | 10/2007 | Araujo, Jr. | G06F 21/6218 718/1 |
| 2007/0260723 | A1 * | 11/2007 | Cohen | G06F 9/5027 709/223 |
| 2008/0005398 | A1 * | 1/2008 | Huffman | G06F 3/0611 710/39 |
| 2008/0080552 | A1 * | 4/2008 | Gates | H04L 12/66 370/468 |
| 2008/0147671 | A1 * | 6/2008 | Simon | G06F 17/30899 |
| 2008/0184225 | A1 * | 7/2008 | Fitzgerald | G06F 9/455 718/1 |
| 2008/0301674 | A1 * | 12/2008 | Faus | G06F 9/45558 718/1 |
| 2009/0199177 | A1 * | 8/2009 | Edwards | G06F 9/5077 718/1 |
| 2009/0276771 | A1 * | 11/2009 | Nickolov | G06F 9/4856 717/177 |
| 2010/0031270 | A1 * | 2/2010 | Wu | G06F 9/5016 718/107 |
| 2010/0088699 | A1 * | 4/2010 | Sasaki | G06F 8/63 718/1 |
| 2010/0161879 | A1 * | 6/2010 | Nation | G06F 12/0813 711/103 |
| 2010/0275200 | A1 * | 10/2010 | Radhakrishnan | G06F 9/452 718/1 |
| 2011/0102443 | A1 * | 5/2011 | Dror | G06T 1/20 345/522 |
| 2011/0252135 | A1 * | 10/2011 | Kudo | G06F 9/5044 709/224 |

(56) References Cited

U.S. PATENT DOCUMENTS

| | | | |
|---|---|---|---|
| 2011/0302578 A1* | 12/2011 | Isci | G06F 9/5077 718/1 |
| 2012/0036515 A1* | 2/2012 | Heim | G06F 9/5088 718/105 |
| 2012/0110574 A1* | 5/2012 | Kumar | G06F 9/45558 718/1 |
| 2012/0159648 A1* | 6/2012 | Park | G06F 21/10 726/28 |
| 2013/0235874 A1* | 9/2013 | Ringdahl | H04L 12/4641 370/395.53 |
| 2013/0263131 A1* | 10/2013 | Beda, III | G06F 8/63 718/1 |
| 2014/0176583 A1* | 6/2014 | Abiezzi | G06T 1/20 345/522 |
| 2014/0189109 A1* | 7/2014 | Jang | H04L 67/10 709/224 |
| 2014/0207425 A1* | 7/2014 | Yeung | G06F 17/5009 703/2 |
| 2014/0214922 A1* | 7/2014 | Kim | H04L 63/102 709/203 |
| 2015/0040121 A1* | 2/2015 | Barabash | G06F 9/45558 718/1 |
| 2015/0256474 A1 | 9/2015 | Ringdahl et al. | |
| 2016/0162308 A1* | 6/2016 | Chen | G06F 9/45558 718/1 |
| 2017/0212842 A1* | 7/2017 | Khosrowpour | G06F 12/0893 |

OTHER PUBLICATIONS

Second office action in U.S. Appl. No. 11/875,297, dated Apr. 2, 2010.
Third office action in U.S. Appl. No. 11/875,297, dated May 11, 2012.
Fourth office action in U.S. Appl. No. 11/875,297, dated Mar. 3, 2013.
Notice of Allowability in U.S. Appl. No. 11/875,297, dated Jan. 2, 2014.
First office action in U.S. Appl. No. 11/875,375, dated Sep. 28, 2010.
Second office action in U.S. Appl. No. 11/875,375, dated Mar. 8, 2011.
Third office action in U.S. Appl. No. 11/875,375, dated Apr. 20, 2012.
Notice of Allowability in U.S. Appl. No. 11/875,375, dated Nov. 30, 2012.
First office action in U.S. Appl. No. 13/716,289, dated Jul. 3, 2014.
Second office action in U.S. Appl. No. 13/716,289, dated Dec. 19, 2014.

* cited by examiner

Desktop Manager 200
    desktop model 202
    list of servers 204
    server capacity 206
    server utilization 208

FIG.2

Tenant data 300
    list of users 302
    list of user pools 304
    quota 306
    current usage 308
    other tenant data 310

FIG.3

Pool of users 400
    pool name 401
    list of users 402
    desktop model 404
    data center 406
    gold pattern 408

FIG.4

User data 500
    assigned pool 502
    entitlements 504
    Other user data 506

FIG.5

RESOURCE MANAGEMENT FOR MULTIPLE DESKTOP CONFIGURATIONS FOR SUPPORTING VIRTUAL DESKTOPS OF DIFFERENT USER CLASSES

RELATED APPLICATIONS

This application is a continuation application of U.S. application Ser. No. 14/203,520, filed Mar. 10, 2014, which is incorporated herein by reference in its entirety.

BACKGROUND

A virtual desktop is a combination of computing resources, such as processor, memory, storage and computer network access, and computer programs running on such resources, which is remotely accessed by a user from a remote device. Such computer programs typically include an operating system, and one or more applications running on the computer that utilize the computer resources as managed by the operating system. The remote device provides an input and output interface between an individual user and the virtual desktop. The remote device communicates inputs to the virtual desktop and receives display information from the virtual desktop for display on the remote device over a computer network. An application is used on the remote device to connect to the virtual desktop.

A service provider can provide virtual desktops as a service to multiple customers, also called tenants. The service provider generally maintains one or more data centers, which is a location that houses multiple server computers on which virtual desktops are implemented. A tenant typically is an enterprise that has multiple users. Each user typically has a set of applications and resources based on a classification of the user. The service provider manages the server computers so as to provision sets of virtual desktops on its server computers for use by the users of each tenant.

Generally speaking, the service provider desires to isolate its customers from selection and management of hardware configurations, i.e., server computers, used to support the virtual desktops, yet can operate more profitably by efficiently allocating resources of its server computers to its tenants. For example, different pools of users may be better supported using different kinds of computer hardware configurations. For example, users with a graphics intensive workload, such as individuals using computer-aided design or three-dimensional animation applications, would be better served by computer hardware incorporating graphics processing units and substantial memory. Other users may use more memory than others, but need not use graphics processors.

SUMMARY

This Summary is provided to introduce a selection of concepts in a simplified form that are further described below in the Detailed Description. This Summary is intended neither to identify key or essential features of the claimed subject matter, nor to limit the scope of the claimed subject matter.

A service provider can efficiently allocate server computer resources to tenant users, while isolating tenants from such allocation decisions. A tenant specifies a desktop model to be used for virtual desktops to be provisioned for a pool of users. The service provider has desktop managers for each tenant, each of which manages a homogeneous set of server computers to be used for provisioning virtual desktops for the tenant. Different desktop managers for a tenant are used to manage different sets of server computers to support virtual desktops using different desktop models or desktop models with different resource requirements. A resource manager of the service provider assigns virtual desktops to a desktop manager in a manner that optimizes the utilization of the server computers by using information about the desktop model used by the virtual desktops.

Accordingly, in one aspect, a computer system that supports virtual desktops on server computers for access by remote user computers includes a resource manager that receives a request to provision a plurality of virtual desktops for a pool of users for an enterprise according to a desktop model. In response to the request, the resource manager selects one of the desktop managers for the enterprise according to the specified desktop model. The requested plurality of virtual desktops are provisioned on one or more of the server computers managed by the selected desktop manager, so as to optimize utilization of the server computers by the virtual desktops for the enterprise.

In another aspect, a resource manager receives a request to provision a plurality of virtual desktops for a pool of users for an enterprise according to a desktop model. In response to the request, the resource manager selects one of the desktop managers for the enterprise according to the specified desktop model. The requested plurality of virtual desktops are provisioned on one or more of the server computers managed by the selected desktop manager, so as to optimize utilization of the server computers by the virtual desktops for the enterprise.

In another aspect, an article of manufacture includes a computer readable storage device, with computer program instructions stored on the computer readable storage device, that when read from the computer readable storage device and processed by a processor of a computer, configure the computer to operate as such a resource manager within such a computer system.

Yet another aspect includes a computer-implemented process performed by such a resource manager, and by such a computer system including such a resource manager.

In the following description, reference is made to the accompanying drawings which form a part hereof, and in which are shown, by way of illustration, specific example implementations. Other implementations may be made without departing from the scope of the disclosure.

DESCRIPTION OF THE DRAWINGS

FIG. 2 is an illustration of a data structures maintained for a desktop manager.

FIG. 3 is an illustration of a data structures maintained for a tenant.

FIG. 4 is an illustration of a data structures maintained for a pool of users.

FIG. 5 is an illustration of a data structures maintained for a user.

DETAILED DESCRIPTION

The following section provides an example implementation of a computer system that supports virtual desktops for multiple tenants with multiple user classes.

Figure 1:
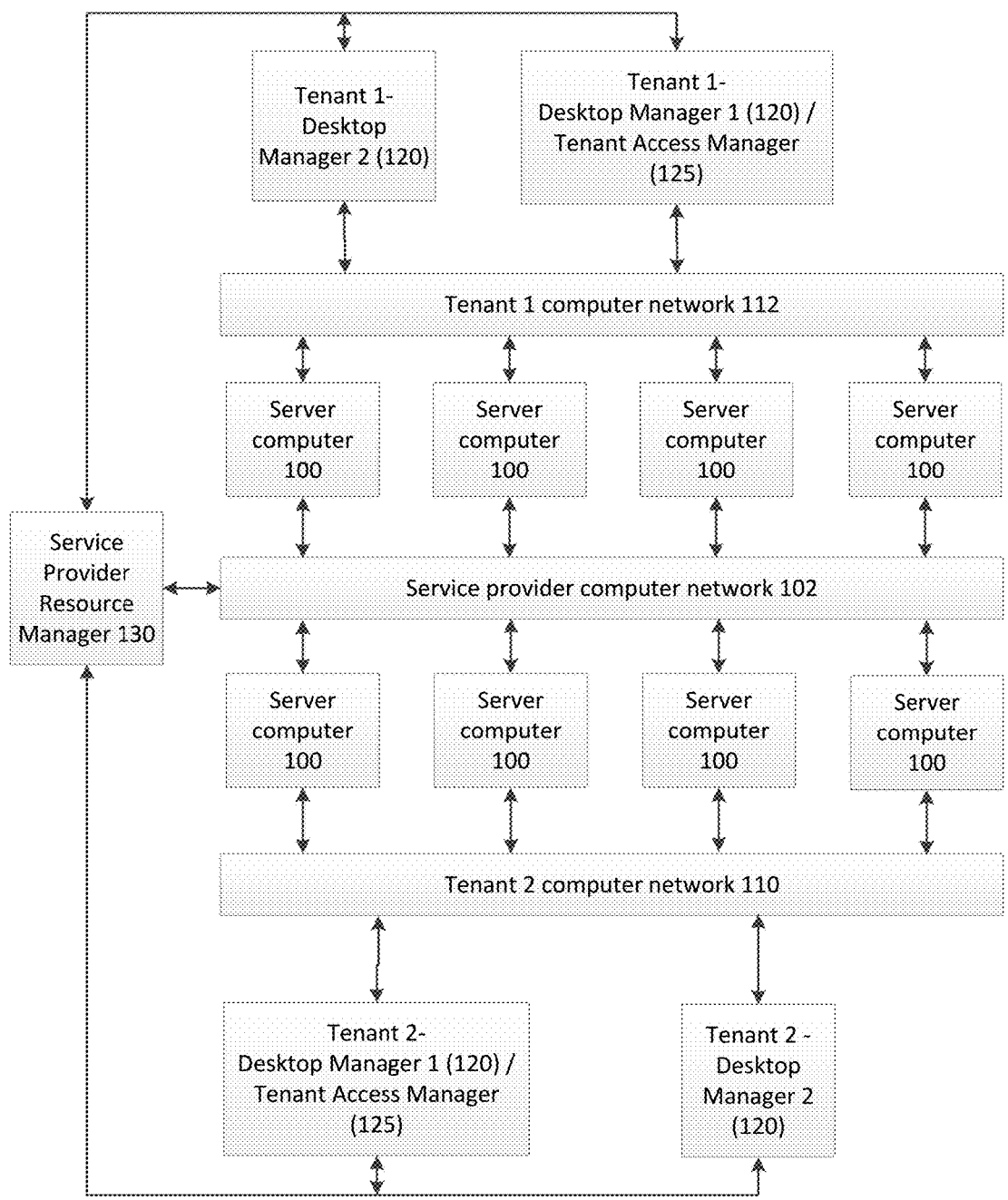
FIG. 1 is a block diagram of an example implementation of a computer system that supports virtual desktops for multiple tenants with multiple user classes.
Figure 8:
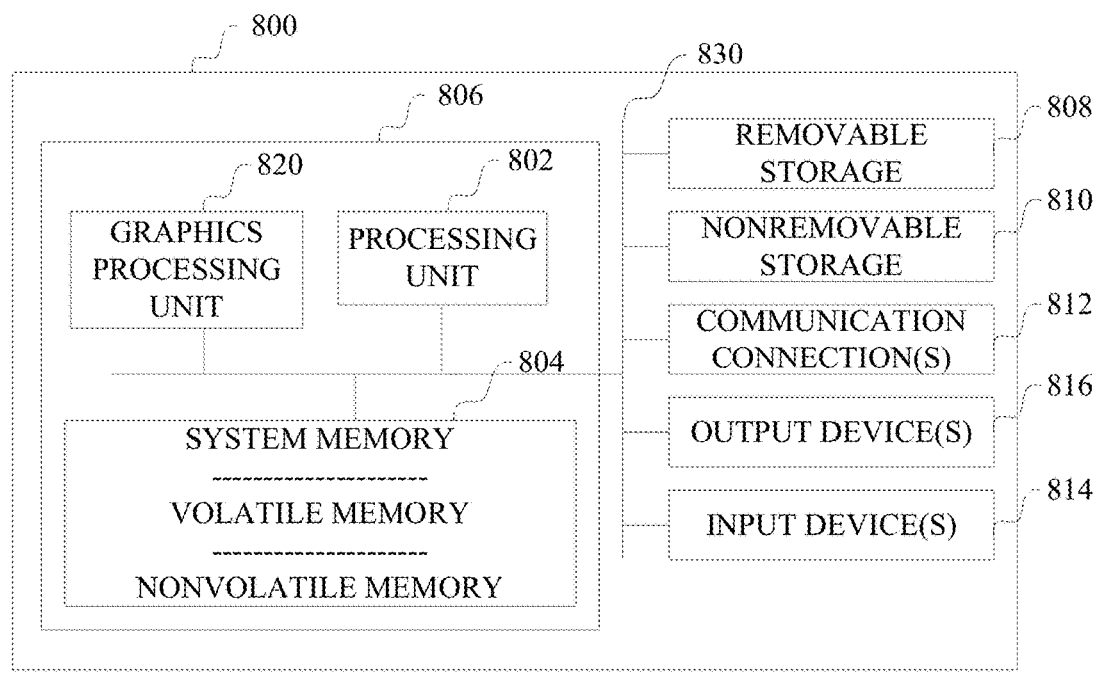
FIG. 8 is a block diagram of an example general purpose computer.

As shown in FIG. 1, a service provider has one or more locations in which multiple server computers 100 are located. The server computers 100 are interconnected by a service provider management computer network 102, on the one hand, to allow the service provider to manage the server computers for use by tenants. A tenant typically is an enterprise, such as a corporation or other organization of multiple individuals. A connection between servers can be provided through a port on a network interface of the server computer to allow kernel level access to the server computer by other computers on the service provider computer network to manage the servers. The server computers 100 also are connected to respective tenant computer networks 110, 112. Such a connection is provided through a separate port on the network interface of the server computer to allow the virtual desktops provisioned on the server computer to connect to the tenant computer network. The tenant computer networks allow virtual desktops for a tenant to access that tenant's private resources, such as directory services, file shares, applications, printers and other network connected resources. A server computer generally is a computer having an architecture such as shown in FIG. 8 below.

Two or more desktop managers 120 on the tenant computer network also are established for each tenant. Each desktop manager aggregates services for and information about virtual desktops available on the tenant computer network, and manages session state and allocation of virtual desktops to tenant users. A desktop manager generally is a computer having an architecture such as shown in FIG. 8 below. While separate computers are shown in FIG. 1, one or more desktop managers can be supported by the same computer. Desktop managers are created and configured for each tenant based on the desktop models that the tenant requests.

A tenant also has access to a tenant access manager computer (125). The tenant access manager computer allows a tenant to request the service provider provision one or more virtual desktops for a pool of users, as described in more detail below. The tenant access manager computer can provide other functionality such as account management, user entitlement, user authentication and authorization, utilization reporting, and the like. After a request from a tenant user to access a virtual desktop provisioned for the user, the tenant access manager contacts the desktop manager for the tenant to obtain information about a virtual desktop to be allocated to the user. The desktop manager provides an indication of a network address and a port through which the virtual desktop can be accessed on one of the server computers for the tenant. A tenant access manager generally is a computer having an architecture such as shown in FIG. 8 below, but is shown in FIG. 1 as being incorporated in the same computer as one of the desktop managers.

In this illustrative example, two tenants each with two different desktop managers are shown. While this example shows different tenants being assigned different server computers, it is possible to have different tenants share resources of a server computer.

A resource manager 130 allows the service provider to configure the server computers 100 to support virtual desktops, but without access to its tenants' computer networks or the virtual desktops. As described in more detail below, the resource manager receives requests, through tenant management computers, to provision virtual desktops for pools of users. These requests indicate a "desktop model" as described in more detail below. Using information about the server computers associated with each desktop manager of the tenant, the resource manager allocates the virtual desktops to the server computers assigned to the tenant so as to optimize the service provider's resource utilization for that tenant. A resource manager generally is a computer having an architecture such as shown in FIG. 8 below.

To allow the service provider to isolate the tenant from allocation decisions that allow the service provider to optimize its resource allocation, the concept of a desktop model is used, along with using multiple desktop managers that manage server computers based on desktop models supported by those server computers. A desktop model represents the resources used to support a virtual desktop, and different users can be assigned different desktop models based on their likely workload.

Additionally, the set of server computers managed by each desktop manager are homogeneous, i.e., each server computer provides the same hardware resources to each virtual desktop as other server computers managed by the same desktop manager. As noted above, a server computer generally has an architecture such as described in FIG. 8 below. Multiple types of server computers can be provided to support different types of workloads. For example, some users may use a conventional, dedicated virtual desktop to which a user computer connects through Virtual Desktop Infrastructure (VDI). In VDI based implementations, a virtual desktop is executed by provisioning a dedicated virtual machine on a physical server in a data center and assigning the virtual machine to a remote user. The dedicated virtual machine then executes the operating system and various applications to provide the virtual desktop remotely to the user. Other users may use a shared session of a virtual desktop (this would be done using a Windows Server) instead of a dedicated virtual machine, to which a user computer connects through remote desktop services (RDS). In RDS based implementations, an operating system (e.g., Windows) component enables a user to remotely control a physical computer or a virtual machine over a network. RDS differs from VDI in that multiple RDS sessions run in a single shared server operating system (i.e., Windows) while VDI based implementations provide individual desktop operating system instances for each user. Generally speaking, a user assigned to a dedicated virtual machine based desktop (i.e. VDI implementation) utilizes twice as much virtual memory per virtual CPU than a user assigned to a shared session based desktop (i.e., RDS implementation). Thus, if the same level of memory overcommitment were to be used in both servers, the server computers supporting VDI would typically utilize twice as much memory per CPU as server computers supporting RDS. It is thus advantageous that different desktop managers be used, which include different physical server types, in order to manage these different desktop models. Yet other users may have a graphics intensive workload for which a server computer with one or more graphics processing units (GPU) can be used. The characteristics of the system resources used to support a type of workload is called a desktop model, and can include information such as CPU, memory, storage or other resources that can differ.

Given a request to provision a set of virtual desktops for a pool of users for a tenant according to a desktop model, the service provider selects a desktop manager that manages a set of server computers that is designed to support the specified desktop model. The resource manager then instructs the server computers of the selected desktop manager to provision the set of virtual desktops.

Each desktop manager can support more than one desktop model with the assumption that the desktop models associated with the same desktop manager have a similar workload profile, i.e. the desktop models have a common ratio of number of processing units to number of units of memory. For example a workload requiring 2 GB RAM and 1 CPU and a workload requiring 4 GB RAM and 2 CPUs can be supported by the same desktop manager since the ratio of CPU to memory is both 2:1.

For each tenant, the system generally maintains a list of users and information associating the user to a desktop model. The information about the desktop model is used by the service provider to select a desktop manager, and in turn a server computer, to provision and manage the virtual desktop that can be used by that user. When the virtual desktops are provisioned, the selection of the server computer to support the virtual desktop can be done in a way that optimizes the use of the service provider's resources while isolating the tenant from such decisions.

Given this description of a general operation and functionality of such a system, a more specific example implementation will now be described.

In this example, various data is stored in data structures in data files in a storage device or memory within the system to maintain the information used to assign users to desktop models, to assign server computers and desktop models to desktop managers, and to provision virtual desktops efficiently on the server computers based on the desktop models assigned to pools of users.

Referring now to FIG. 2, the resource manager maintains data about each desktop manager 200 for the tenant, which includes data describing the desktop model 202 or desktop models supported by the desktop manager, and a list 204 of server computers associated with this desktop manager. The desktop models supported can be defined specifically or can be inferred from specifications of the server computers. Information about the capacity 206 of each server, and current usage 208 of each server, also can be determined by the resource manager. The data describing the server utilization of a server can include an indication of the virtual desktops provisioned for each tenant on the server.

Referring to FIG. 3, the resource manager maintains various tenant data 300 for each tenant. The tenant data can include, for example, a list 302 of users and a list of user pools 304. As noted below, a pool can be named and the list of pools can be a list of the pool names. Quota data 306 also can be stored. Typically, a tenant purchases from a service provider access to a number of virtual desktops within each of a number of predefined desktop models, called a quota. This quota also can be stored per desktop model per desktop manager, in which case a desktop manager is queried to determine its quota and current utilization within that quota. A current number of virtual desktops actually provisioned for access by the tenant's users also is tracked, as indicated at 308. When the tenant requests a set of virtual desktops for a pool of users to be provisioned, this quota and the current usage is checked to determine whether the request can be fulfilled. Various other tenant data 310 can be stored such as identification information, contact information and billing information.

Referring to FIG. 4, the tenant access manager stores data for each pool of users 400. The pool can be created, updated or otherwise accessed by the tenant through the resource manager. The data for a pool of users 400 includes a list 402 of users in the pool, and a reference 404 to a desktop model for the pool. A name 401 can be given to the pool. The tenant may be able to specify a data center 406 for the pool, if the service provider has multiple data centers. A reference 408 to a gold pattern (i.e., a base copy of an executable computer program providing the virtual desktop) to be used in provisioning the virtual desktops for this pool also can be included in the data for a pool of users.

Referring to FIG. 5, the tenant access manager maintains user data 500 that permits it to direct requests for access to a virtual desktop to the correct pool of virtual desktops available for that user. In an example implementation, user data 500 includes a reference to the pool 502 or pools with which the user is associated. Entitlements 504 indicate various resources, applications and the like to which the user is authorized access. Other data 506 about the user also can be stored. The reference to the pool 502 can be defined, for example, by a specific reference to a pool such as in FIG. 4, or by reference to a desktop model or desktop manager, for example.

These various data structures can be created, read, updated, written, deleted and stored by the service provider through the resource manager or by the tenant through the tenant desktop manager communicating with the resource manager. Both systems include computers (such as described in FIG. 8 below) configured by computer programs to provide access to the stored data. For example, the data can be made accessible through a browser application running on a computer that accesses the computer storing the data, which in turn provides an interface to the browser application that allows a user to view and enter data. For example, a user interface can be provided on the tenant access manager to specify a pool, including the list of users, a name for the pool, the desktop model to be used by the pool, the data center in which the virtual desktops will be provisioned, and the gold pattern to be used to provision the desktops. A service provider may offer to each tenant multiple data centers, desktop models and gold patterns from which such selections can be made.

Figure 6:
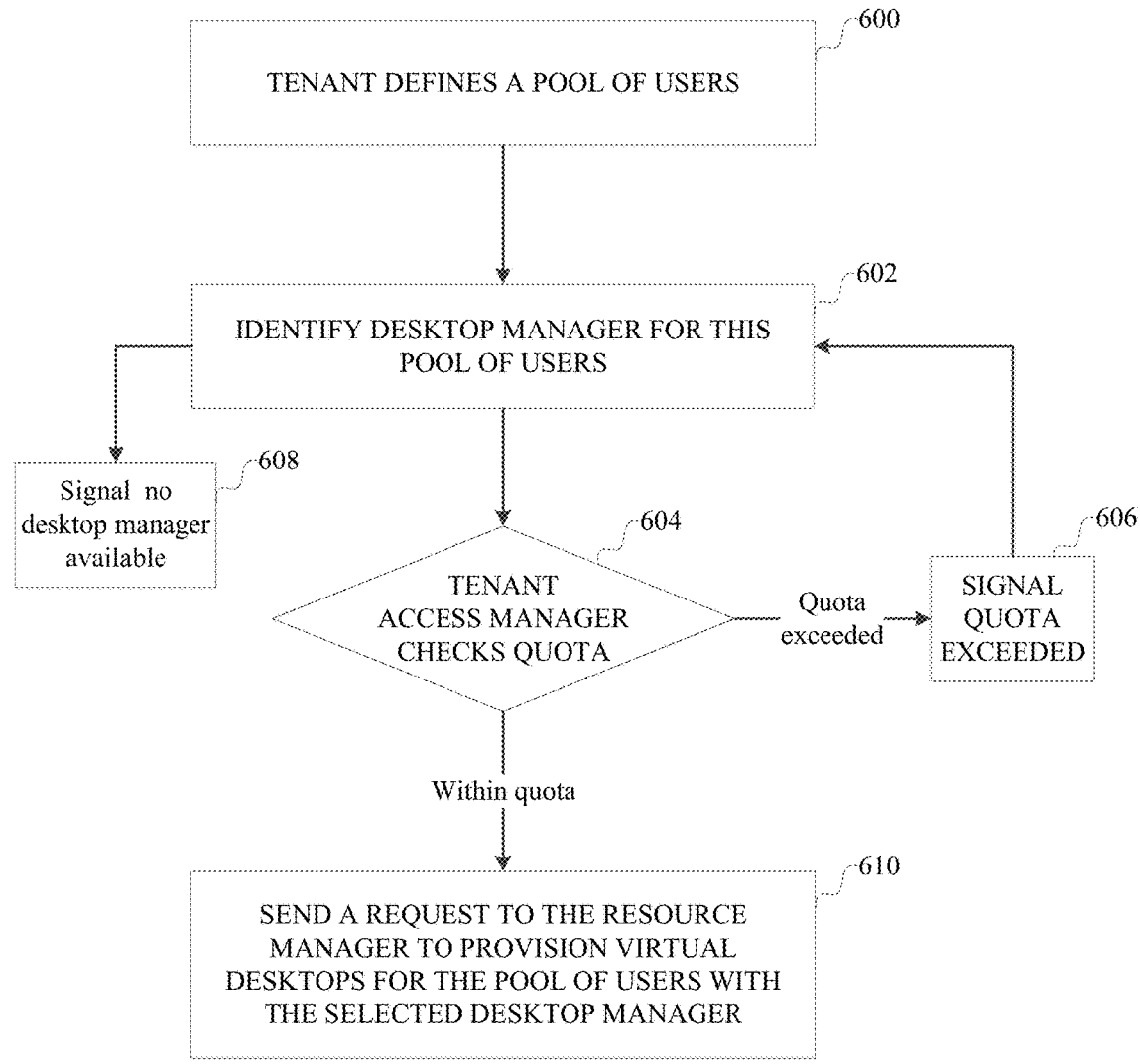
FIG. 6 is a flow chart describing provisioning of virtual desktops for a pool of users according to a desktop model.
Figure 7:
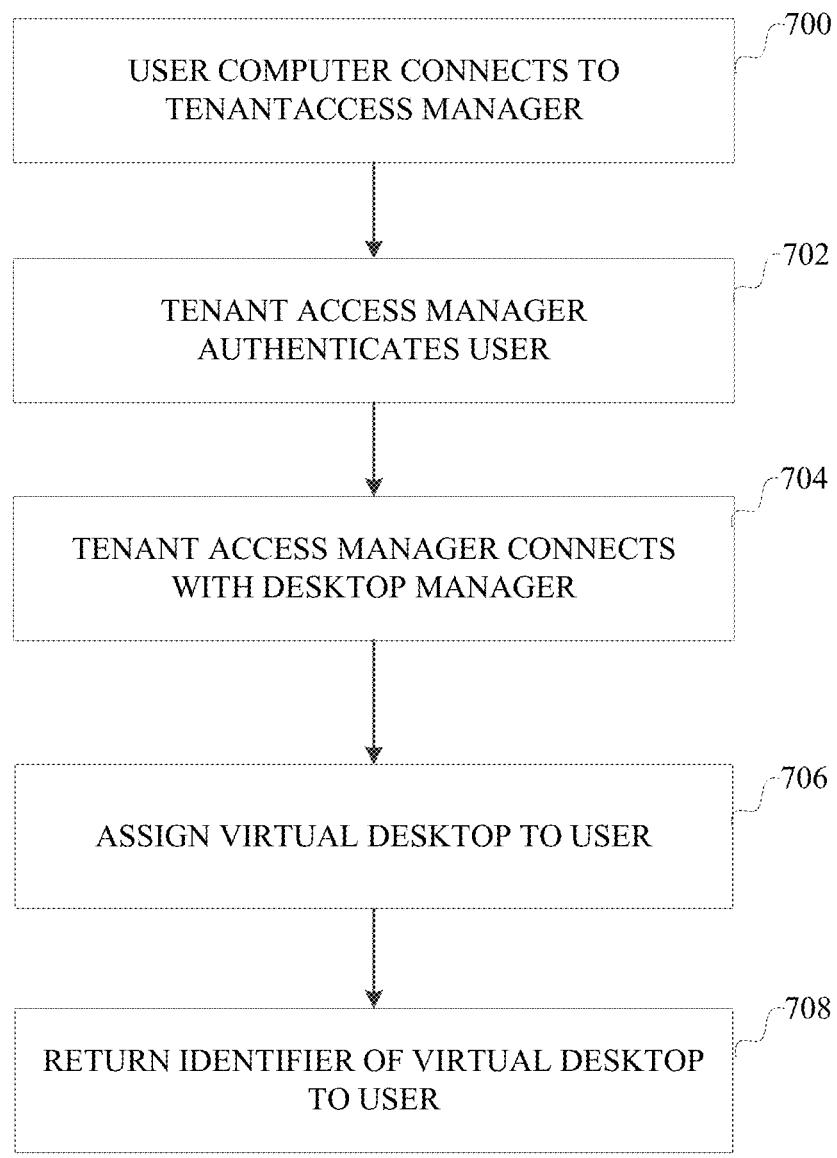
FIG. 7 is a flow chart describing user access to a provisioned virtual desktop.

Given a system so configured as described above in connection with FIGS. 1-5, example implementations of operations of such as a system to support users from multiple tenants will now be described in connection with FIGS. 6-7. FIG. 6 describes provisioning virtual desktops for a pool of users. FIG. 7 describes how a user accesses the virtual desktop.

Referring now to FIG. 6, a tenant issues a request to the resource manager of the service provider to provision a set of virtual desktops for a pool of users, in response to which the resource manager provisions the virtual desktops on the server computers in a manner that efficiently uses the resources of those server computers.

First, the tenant defines 600 the pool of users. This definition can be performed, for example, using an interface in a browser application on the tenant access manager which interfaces with the resource manager. For example, the user can provide a name for the pool, select a list of users to be associated with the pool from among a set of tenant users, and select a desktop model, data center and gold pattern to be associated with the pool (see FIG. 4).

The tenant access manager then identifies 608 a desktop manager that manages server computers in the specified data center which can support the desktop model specified for the pool. The desktop manager is selected so as to optimize the fit of the set of virtual desktops for this pool of users to the resources available in the server computers according to selected criteria. In particular, the selected desktop manager is identified as supporting the specified desktop model and having sufficient remaining capacity to support the number of requested virtual desktops.

The optimization that can be performed depends on the criteria used and how desktop models are associated with desktop managers.

In one implementation, each desktop manager is associated with a single desktop model, and the set of server computers managed by the desktop manager is homogeneous with respect to the resources available (e.g., processors and memory) on those server computers. Each server computer managed by a desktop manager has available resources that is an integer number multiple of the resources used by the virtual desktop of the desktop model for that desktop manager. For example, if the desktop model calls for a ratio of two units (e.g., gigabytes) of memory to one processing unit (e.g., a 2:1 resource ratio), then each server computer has an integer multiple of two units of memory and an integer multiple of one processing units.

In another implementation, each desktop manager is associated with two or more similar desktop models. The set of server computers managed by the desktop manager is homogeneous with respect to the resources available (e.g., processors and memory) on those server computers. Desktop models are similar if the resource ratios (e.g., units of memory to number of processing units) are the same. For example, one desktop model can use four units of memory and two processors, while another desktop model can use two units of memory and one processor. Both of these desktop models, if otherwise using the same resources, can be managed by the same desktop manager.

Other implementations using more complex optimization algorithms can be used if the resource ratios of different desktop models are different, yet the resources used by those desktop models are otherwise the same, which would allow the same set of homogeneous server computers to be used by the same desktop manager for the different desktop models. The optimization is intended to avoid a situation for the service provider where either the memory or processing units of the server computer are underutilized due to the other resource (memory or processing units) being fully utilized. Such optimization also can take into consideration that a server computer may also be partitioned for use by the service provider for multiple tenants.

Given a selected desktop manager, the tenant access manager can check 604 to ensure that the requested virtual desktops would not exceed the quota for that desktop manager, and can signal 606 that the quota is exceeded. This check also can be performed interactively at the time the request is being formulated through the interface used to define the request. If this desktop manager would exceed its quota, a different desktop manager can be selected. If no desktop manager is available, then such a condition can be signaled as indicated at 608.

After desktop manager that has sufficient capacity for the selected pool of users has been identified, the tenant user instructs the tenant access manager computer to send 610 a request to the resource manager computer to provision a set of virtual desktops for the specified pool of users, according to the information provided for the pool. In turn, the resource manager provisions the virtual desktops on the server computers managed by that desktop manager using the specified gold pattern for that pool of users. After the virtual desktops are provisioned, users can access and use the virtual desktops through the access manager.

Referring now to FIG. 7, when a user for a tenant accesses the service provider computers to use a virtual desktop, the user utilizes a computer that connects 700 to the tenant access manager.

The tenant access manager 702 authenticates the user. Errors are signaled if the user is not properly authenticated. Using the examples described above, given a user identifier, the pool to which the user is assigned is identified. In turn, the data center and desktop model for that user are identified.

The tenant access manager contacts 704 the desktop manager in the data center associated with the desktop model for the user pool, to request an identifier for a virtual desktop running on one of the server computers associated with the desktop manager. It is possible that the virtual desktops for the user pool are underprovisioned, i.e., there are fewer virtual desktops than users in the pool. If all of the virtual desktops are being used, then the tenant access manager rejects the request for access from the user. Otherwise, a virtual desktop is assigned 706 to the user and an identifier for a virtual desktop in this class is returned to the user 708.

The resource manager and desktop managers as described above allow a service provider to optimize utilization of its server computers based on the desktop models specified by a tenant for each pool of users for the tenant, while isolating the tenant from decisions regarding allocation of its virtual desktops within the service provider's infrastructure.

FIG. 8 illustrates an example computer with which various components of the system described above can be implemented. The computer illustrated in FIG. 8 is only one example of general purpose computer and is not intended to suggest any limitation as to the scope of use or functionality of such a computer.

With reference to FIG. 8, an example computer in a basic configuration includes at least one processing unit 802 and memory 804. The computer can have multiple processing units 802. A processing unit 802 can include one or more processing cores (not shown) that operate independently of each other. Additional co-processing units, such as graphics processing unit 820, also can be present in the computer. The memory 804 may be volatile (such as RAM), non-volatile (such as ROM, flash memory, etc.) or some combination of the two. This basic configuration is illustrated in FIG. 8 by dashed line 806. The computer 800 may include additional storage (removable and/or non-removable) including, but not limited to, magnetic or optical disks or tape. Such additional storage is illustrated in FIG. 8 by removable storage 808 and non-removable storage 810.

A computer storage medium is any medium in which data can be stored in and retrieved from addressable physical storage locations by the computer. Computer storage media includes volatile and nonvolatile, removable and non-removable media. Memory 804, removable storage 808 and non-removable storage 810 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 800 also may include communications connection(s) 812 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. Communications connections 812 are devices, such as a network interface or radio transmitter, that interface with the communication media to transmit data over and receive data from communication media.

Computing machine 800 may have various input device(s) 814 such as a keyboard, mouse, pen, camera, touch input device, and so on. Output device(s) 816 such as a display, speakers, a printer, and so on may also be included. All of these devices are well known in the art and need not be discussed at length here.

The various components in FIG. 8 are generally interconnected by an interconnection mechanism, such as one or more buses 830.

Each component of the system as described herein which operates using a computer can be implemented by a computer that is configured by one or more computer programs being processed by one or more processing units in the computer. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the computer to include various devices or data structures. This computer system may be practiced in distributed computing environments where tasks are performed by remote computers that are linked through a communications network. In a distributed computing environment, computer programs may be located in both local and remote computer storage media. The computer can be made highly available using conventional techniques in which computer hardware may be duplicated and includes fail over operations.

It should be understood that the subject matter defined in the appended claims is not necessarily limited to the specific implementations described above. The specific implementations described above are disclosed as examples only.

What is claimed is:

1. A method comprising:
receiving a request to provision virtual desktops for a pool of users, the pool of users identifying each user as a member of the pool and assigning the users to a selected desktop model of a plurality of desktop models, wherein each desktop model specifies hardware resource requirements for virtual desktops provisioned according to the desktop model;
in response to the received request, selecting a desktop manager from a plurality of desktop managers based on the desktop model selected for the pool of users, the plurality of desktop managers being distinct from the virtual desktops, and wherein one or more server computers are assigned to each desktop manager, the one or more server computers each configured to support virtual desktops provisioned according to the hardware resource requirements of a particular desktop model supported by the corresponding desktop manager; and
provisioning the virtual desktops on the one or more server computers assigned to the selected desktop manager according the hardware resource requirements of the selected desktop model.

2. The method of claim 1, wherein selecting the desktop manager further comprises:
determining whether the requested virtual desktops for the pool of users would exceed a quota of virtual desktops for the desktop manager.

3. The method of claim 1, wherein each of the one or more server computers managed by the desktop manager has available hardware resources that are an integer multiple of the hardware resources used by a virtual desktop according to the desktop model.

4. The method of claim 1, wherein two or more desktop models of the plurality of desktop models have different hardware resource ratios.

5. The method of claim 1, wherein a particular desktop manager can be associated with two or more desktop models if the two or more desktop models share a same hardware resource ratio.

6. The method of claim 1, wherein in response to a user request to use a virtual desktop:
requesting an identifier from the desktop manager for a virtual desktop; and
providing access to the virtual desktop to the user.

7. A system comprising:
one or more computers, the one or more computers including one or more processors and one or more storage devices, the one or more computers configured to perform operations comprising:
receiving a request to provision virtual desktops for a pool of users, the pool of users identifying each user as a member of the pool and assigning the users to a selected desktop model of a plurality of desktop models, wherein each desktop model specifies hardware resource requirements for virtual desktops provisioned according to the desktop model;
in response to the received request, selecting a desktop manager from a plurality of desktop managers based on the desktop model selected for the pool of users, the plurality of desktop managers being distinct from the virtual desktops, and wherein one or more server computers are assigned to each desktop manager, the one or more server computers each configured to support virtual desktops provisioned according to the hardware resource requirements of a particular desktop model supported by the corresponding desktop manager; and
provisioning the virtual desktops on the one or more server computers assigned to the selected desktop manager according the hardware resource requirements of the selected desktop model.

8. The system of claim 7, wherein selecting the desktop manager further comprises:
determining whether the requested virtual desktops for the pool of users would exceed a quota of virtual desktops for the desktop manager.

9. The system of claim 7, wherein each of the one or more server computers managed by the desktop manager has available hardware resources that are an integer multiple of the hardware resources used by a virtual desktop according to the desktop model.

10. The system of claim 7, wherein two or more desktop models of the plurality of desktop models have different hardware resource ratios.

11. The system of claim 7, wherein a particular desktop manager can be associated with two or more desktop models if the two or more desktop models share a same hardware resource ratio.

12. The system of claim 7, wherein in response to a user request to use a virtual desktop:
 requesting an identifier from the desktop manager for a virtual desktop; and
 providing access to the virtual desktop to the user.

13. One or more a computer readable storage devices including computer program instructions, that when processed by one or more processors are configured to perform operations comprising:
 receiving a request to provision virtual desktops for a pool of users, the pool of users identifying each user as a member of the pool and assigning the users to a selected desktop model of a plurality of desktop models, wherein each desktop model specifies hardware resource requirements for virtual desktops provisioned according to the desktop model;
 in response to the received request, selecting a desktop manager from a plurality of desktop managers based on the desktop model selected for the pool of users, the plurality of desktop managers being distinct from the virtual desktops, and wherein one or more server computers are assigned to each desktop manager, the one or more server computers each configured to support virtual desktops provisioned according to the hardware resource requirements of a particular desktop model supported by the corresponding desktop manager; and
 provisioning the virtual desktops on the one or more server computers assigned to the selected desktop manager according the hardware resource requirements of the selected desktop model.

14. The one or more computer readable storage devices of claim 13, wherein selecting the desktop manager further comprises:
 determining whether the requested virtual desktops for the pool of users would exceed a quota of virtual desktops for the desktop manager.

15. The one or more computer readable storage devices of claim 13, wherein each of the one or more server computers managed by the desktop manager has available hardware resources that are an integer multiple of the hardware resources used by a virtual desktop according to the desktop model.

16. The one or more computer readable storage devices of claim 13, wherein two or more desktop models of the plurality of desktop models have different hardware resource ratios.

17. The one or more computer readable storage devices of claim 13, wherein a particular desktop manager can be associated with two or more desktop models if the two or more desktop models share a same hardware resource ratio.

18. The one or more computer readable storage devices of claim 13, wherein in response to a user request to use a virtual desktop:
 requesting an identifier from the desktop manager for a virtual desktop; and
 providing access to the virtual desktop to the user.

* * * * *